(12) United States Patent
Kwon et al.

(10) Patent No.: US 8,849,289 B2
(45) Date of Patent: Sep. 30, 2014

(54) METHOD AND APPARATUS FOR BAND TRANSFER IN MULTIBAND COMMUNICATION SYSTEM

(75) Inventors: Hyuk-choon Kwon, Seoul (KR); Hae-young Jun, Seoul (KR); Ho-dong Kim, Gwacheon-si (KR); Soo-yeon Jung, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 125 days.

(21) Appl. No.: 12/887,881

(22) Filed: Sep. 22, 2010

(65) Prior Publication Data
US 2011/0070842 A1     Mar. 24, 2011

Related U.S. Application Data

(60) Provisional application No. 61/244,969, filed on Sep. 23, 2009.

(30) Foreign Application Priority Data

Sep. 2, 2010  (KR) .................. 10-2010-0086170

(51) Int. Cl.
*H04W 36/30*  (2009.01)
*H04W 76/04*  (2009.01)

(52) U.S. Cl.
CPC ............ *H04W 36/30* (2013.01); *H04W 76/043* (2013.01)
USPC ...................... 455/450; 455/67.11; 455/67.13

(58) Field of Classification Search
USPC .................. 455/67.11, 67.13, 450–452.2
See application file for complete search history.

(56) References Cited

U.S. PATENT DOCUMENTS

| 4,872,182 | A  | * | 10/1989 | McRae et al. ................. 375/141 |
| 5,809,421 | A  | * | 9/1998 | Manssen et al. ............. 455/434 |
| 6,047,175 | A  | * | 4/2000 | Trompower ............... 455/452.1 |
| 8,301,190 | B2 | * | 10/2012 | Chandra .................... 455/552.1 |
| 2003/0134642 | A1 | * | 7/2003 | Kostic et al. ................. 455/450 |
| 2006/0205444 | A1 | * | 9/2006 | Aerrabotu et al. ........... 455/574 |
| 2007/0086471 | A1 | * | 4/2007 | Igarashi et al. ............... 370/412 |
| 2009/0233597 | A1 | * | 9/2009 | Wright et al. ................ 455/433 |
| 2009/0323531 | A1 | * | 12/2009 | Matta ........................... 370/235 |
| 2011/0065440 | A1 | * | 3/2011 | Kakani ........................ 455/450 |
| 2011/0130092 | A1 | * | 6/2011 | Yun et al. ....................... 455/39 |

OTHER PUBLICATIONS

IEEE 100 The Authoritative Dictionary of IEEE Standards Terms, Dec. 2000, IEEE Press, 7th Edition.*

* cited by examiner

*Primary Examiner* — Gennadiy Tsvey
(74) *Attorney, Agent, or Firm* — Sughrue Mion, PLLC

(57) ABSTRACT

A method and apparatus for transferring to a second communication band and returning to an original communication band according to a channel state in a multiband communication system are provided. The method includes communicating with a peer device in a first band, determining a channel state of a second band, and transferring to the second band based on a result of the determination, thereby efficiently using a plurality of bands and thus improving a data transmission speed.

28 Claims, 9 Drawing Sheets

FIG. 1

Multiband IE

| Element ID | Length | Multi-band Control | Regulatory Class | Channel Number | BSSID | Beacon Interval | TSF Offset | STA MAC Address (optional) |
|---|---|---|---|---|---|---|---|---|
| 1 | 1 | 1 | 1 | 1 | 6 | 2 | 8 | 6 |

Octets:

↗ 110

Multiband Control Field

| STA Role | Peer STA Reachable | FST Mode | STA MAC Address present | Active | Reserved |
|---|---|---|---|---|---|
| 1 | 1 | 1 | 1 | 1 | 3 |

Bits:

| | STA Role | STA Role Reachable | FST Mode | FST Mode Address Present | Active | Channel Sweep | Reserved |
|---|---|---|---|---|---|---|---|
| Bits: | 1 | 1 | 1 | 1 | 1 | 1 | 2 |

| | STA Role | STA Role Reachable | FST Mode | FST Mode Address Present | Active | Peer STA Negotiation | Reserved |
|---|---|---|---|---|---|---|---|
| Bits: | 1 | 1 | 1 | 1 | 1 | 1 | 2 |

710

| Order | Information |
|---|---|
| 1 | Category |
| 2 | Action |
| 3 | LLT |
| 4 | Link monitoring period (optional) |

810

METHOD AND APPARATUS FOR BAND TRANSFER IN MULTIBAND COMMUNICATION SYSTEM

CROSS-REFERENCE TO RELATED PATENT APPLICATION

This application claims the benefit of U.S. Provisional Application No. 61/244,969, filed on Sep. 23, 2009, in the USPTO and Korean Patent Application No. 10-2010-0086170, filed on Sep. 2, 2010, in the Korean Intellectual Property Office, the disclosures of which are incorporated herein in their entirety by reference.

BACKGROUND

1. Field

Apparatuses and methods consistent with the exemplary embodiments relate to a method and apparatus for band transfer in a multiband communication system, and more particularly, to a method and apparatus for returning to an original band after performing fast session transfer (FST).

2. Description of the Related Art

Recently, research on multiband communication systems has been actively carried out. In particular, there is a need for a technique by which if channel performance in a frequency band in use deteriorates, a communication band transfers to another frequency band.

SUMMARY OF THE EXEMPLARY EMBODIMENTS

According to an aspect of the exemplary embodiments, there is provided a communication method of a multiband communication device. The communication method includes communicating with a peer device in a first band, determining a channel state of a second band, and transferring to the second band based on a result of the determination.

The determination may include transmitting control information to the peer device in the first band or the second band, receiving feedback information from the peer device in the first band or the second band, and determining a channel state of the second band based on the feedback information.

The transmission of the control information and the reception of the feedback information may be performed directly with the peer device or via a coordinator.

The feedback information may include a received signal strength indicator (RSSI) or a signal-to-noise ratio (SNR) with respect to communication in the second band.

The determining may include receiving beacon information from a coordinator in the second band at intervals which are products of beacon intervals and a predefined integer.

The determining may include making the determination during a predetermined time at predefined intervals.

The multiband communication device may operate in an active mode during a predetermined time at predefined intervals in the second band and operate in a power saving mode during times other than the predetermined time in the second band.

The predefined intervals may be products of beacon intervals and a predefined integer.

The transferring may include transferring to the second band after an elapse of a predefined time from the start of the communication with the peer device in the first band.

The determining may include making the determination after an elapse of a predefined time from the start of the communication with the peer device in the first band.

The predefined time may be a product of a beacon interval and a predefined integer.

The transferring may include transmitting a second communication band communication setup request message to the peer device in the first communication band or the second communication band, and receiving a second communication band communication setup response message from the peer device in the first band or the second band.

According to another aspect of the exemplary embodiments, there is provided a communication method of a multiband communication device. The communication method includes communicating with a peer device in a first band, transmitting a channel state of a second band to the peer device, and transferring to the second band at a request of the peer device.

The transmitting may include receiving control information from the peer device in the first band or the second band and transmitting feedback information comprising the channel state to the peer device in the first band or the second band.

The transmitting may include receiving beacon information from a coordinator in the second band at intervals which are products of beacon intervals and a predefined integer.

The transmitting may include transmitting the channel state of the second band during a predetermined time at predefined intervals.

The transferring may include transferring to the second band after an elapse of a predefined time from the start of the communication with the peer device in the first band.

The transmitting may include transmitting the channel state of the second band after an elapse of a predefined time from the start of the communication with the peer device in the first band.

The transferring may include receiving a second communication band communication setup request message from the peer device in the first band or the second band and transmitting a second communication band communication setup response message to the peer device in the first band or the second band.

According to another aspect of the exemplary embodiments, there is provided a communication method of a multiband communication device. The communication method includes communicating with a peer device in a first band, transferring to a second band to communicate with the peer device if a channel state of the first band does not meet a predefined first condition during communication in the first band, and returning to the first band to communicate with the peer device if the channel state of the first band meets a predefined second condition during communication in the second band.

According to another aspect of the exemplary embodiments, there is provided a multiband communication device including a communication unit communicating with a peer device in a first band or a second band and a determination unit determining a channel state of the second band, in which the communication unit transfers to the second band based on a result of the determination during communication in the first band.

The communication unit may transmit control information to the peer device in the first band or the second band and receive feedback information from the peer device in the first band or the second band, and the determination unit may determine the channel state of the second band based on the feedback information.

The communication unit may receive beacon information from a coordinator in the second band at predefined intervals which are products of beacon intervals and a predefined integer.

The communication unit may operate in an active mode during a predetermined time at the predefined intervals in the second band and operate in a power saving mode during times other than the predetermined time in the second band.

The communication unit may transfer to the second band after an elapse of a predefined time from the start of communication with the peer device in the first band.

According to another aspect of the exemplary embodiments, there is provided a multiband communication device including a communication unit communicating with a peer device in a first band or a second band and a measurement unit, measuring a channel state of the second band, in which the communication unit transmits the channel state of the second band to the peer device during communication in the first band, and transfers to the second band at the request of the peer device.

The communication unit may receive control information from the peer device in the first band or the second band and transmit feedback information including the channel state of the second band to the peer device in the first band or the second band.

The communication unit may receive beacon information from a coordinator in the second band at predefined intervals which are products of beacon intervals and a predefined integer.

The communication unit may operate in an active mode during a predetermined time at the predefined intervals in the second band and operate in a power saving mode during times other than the predetermined time in the second band.

The communication unit may transfer to the second band after an elapse of a predefined time from the start of communication with the peer device in the first band.

According to another aspect of the exemplary embodiments, there is provided a multiband communication device including a communication unit communicating with a peer device in a first band or a second band and a determination unit determining a channel state of the first band, in which the communication unit transfers to the second band to communicate with the peer device if the channel state of the first band does not meet a predefined first condition during communication in the first band and returns to the first band to communicate with the peer device if the channel state of the first band meets a predefined second condition during communication in the second band.

According to another aspect of the exemplary embodiments, there is provided a computer-readable recording medium having recorded thereon a program for executing the communication method of a multiband communication device, the communication method including communicating with a peer device in a first band, determining a channel state of a second band, and transferring to the second band based on a result of the determination.

According to another aspect of the exemplary embodiments, there is provided a computer-readable recording medium having recorded thereon a program for executing the communication method of a multiband communication device, the communication method including communicating with a peer device in a first band, transmitting a channel state of a second band to the peer device, and transferring to the second band at the request of the peer device.

According to another aspect of the exemplary embodiments, there is provided a computer-readable recording medium having recorded thereon a program for executing the communication method of a multiband communication device, the communication method including communicating with a peer device in a first band, transferring to a second band to communicate with the peer device if a channel state of the first band does not meet a predefined first condition during communication in the first band, and returning to the first band to communicate with the peer device if the channel state of the first band meets a predefined second condition during communication in the second band.

BRIEF DESCRIPTION OF THE DRAWINGS

The above and other aspects will become more apparent by describing in detail exemplary embodiments with reference to the attached drawings in which:

FIG. 1 is a diagram illustrating a multiband information element (IE) and a multiband control field for performing fast session transfer (FST) defined in wireless gigabit (WiGig);

FIGS. 6 and 7 are diagrams illustrating multiband control fields according to an exemplary embodiment;

DETAILED DESCRIPTION OF THE EXEMPLARY EMBODIMENTS

Figure 2:
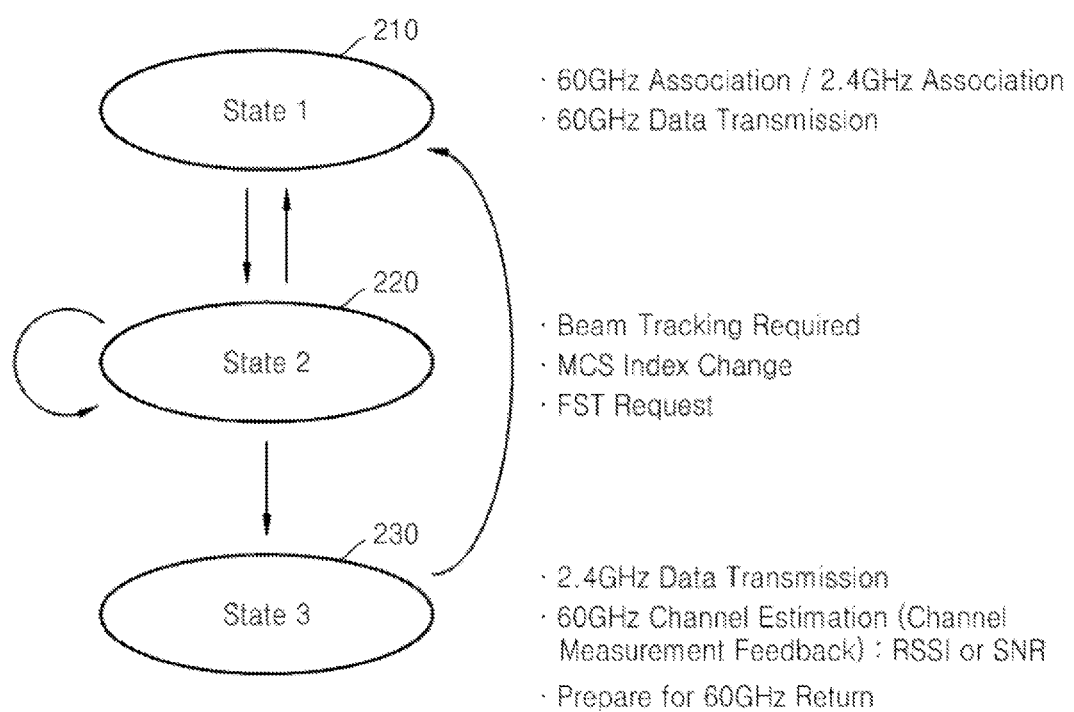
FIG. 2 is a state diagram schematically illustrating FST performed between stations according to an exemplary embodiment.

Hereinafter, exemplary embodiments will be described in detail with reference to the accompanying drawings to clarify the technical spirit of the exemplary embodiments. In the following description, well-known functions and constructions may not be described for clarity and conciseness when their inclusion might obscure appreciation of the subject matter of the exemplary embodiments. Like reference numerals and symbols refer to like elements having substantially the same functional constructions throughout drawings. For convenience, an apparatus and method will be described together if necessary.

Further, expressions such as at least one of, when preceding a list of elements, modify the entire list of elements and do not modify the individual elements of the list.

A detailed description will now be made of exemplary embodiments with reference to the appended drawings.

In a multiband communication system, if during communication in a current band, link connection in the current band is not smooth due to channel blocking caused by an object or channel performance deterioration, the link connection may continue using another band, which is referred to as fast session transfer (FST).

For example, in the wireless gigabit (WiGig) standard, if communication link performance degrades or communication is not possible during communication in a 60 GHz band which is a millimeter wave (mmWave) band, the communication may be performed using an existing wireless local area network (LAN) technique, that is, IEEE 802.11a/b/g/n by transferring to a 2.4 GHz or 5 GHz communication band. For FST, both devices in communication with each other should have implemented therein IEEE 802.11a/b/g/n and WiGig with a single chip or several chips. While the following description will be based on 60 GHz and 2.4 GHz bands for convenience, it is obvious that the exemplary embodiments can also be applied to two arbitrary bands.

A multiband information element (IE) for a multiband support capability of a station for performing FST and a multiband control field including several negotiation parameters necessary for performing FST can be defined. FIG. 1 is a diagram illustrating a multiband IE 110 and a multiband control field 120 for performing FST, defined in WiGig. A detailed description thereof will not be provided because it may unnecessarily obscure the subject matter of the exemplary embodiments.

To improve data throughput, during communication in a 2.4 GHz communication band after FST is performed, it is necessary to continuously monitor communication channel information regarding communication in a previous communication channel, for example, a 60 GHz communication channel, and to return to the 60 GHz communication channel if the 60 GHz channel state improves. Herein, power saving is important in terms of a 60 GHz operation.

FIG. 2 is a state diagram schematically illustrating FST performed between stations according to an exemplary embodiment.

In state 1_210, respective stations belong to 2.4 GHz and 60 GHz channels, and data transmission is being performed in the 60 GHz channel. State 2_220 indicates a feedback situation that may occur when the 60 GHz channel condition deteriorates.

First, there may be situations where beam tracking may be requested. Secondly, a modulation and coding scheme (MCS) index may be changed to reduce a required signal-to-noise ratio (SNR). Finally, FST may be requested. A continuous feedback loop is repeated for these situations. State 3_230 is where data transmission is being performed by forming a 2.4 GHz communication link after FST is performed, channel estimation with respect to the 60 GHz band is performed, and a preparation for a return to the 60 GHz communication channel is performed.

Figure 3:
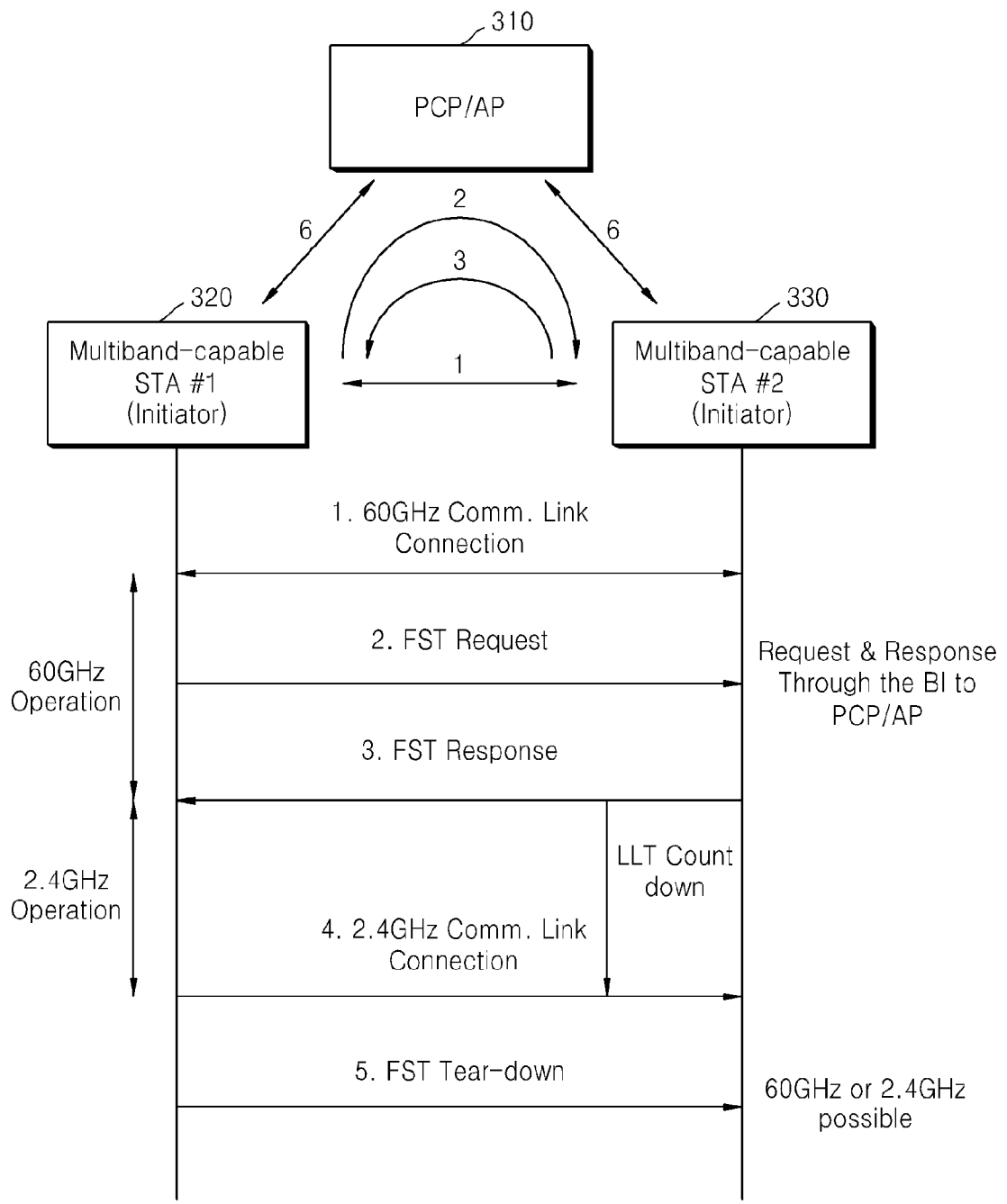
FIG. 3 is a diagram schematically illustrating an FST procedure according to an exemplary embodiment.

FIG. 3 is a diagram schematically illustrating an FST procedure according to an exemplary embodiment.

Each of stations 320 and 330 receives, in operation 6, a beacon message including a multiband IE through a coordinator 310, for example, a private basic service set (PBSS) control point (PCP) or an access point (AP) in a situation where a 60 GHz communication link 1 has been established, and checks a multiband support capability of a peer station which is in communication therewith. An initiator station 320 sends an FST setup request message to a responder station 330 in operation 2. Upon receiving the FST setup request message, the responder station 330 sends an FST setup response message to the initiator station 320 in operation 3, performs a data session in a 2.4 GHz communication channel in operation 4, and then tears down FST in operation 5.

Figure 4:
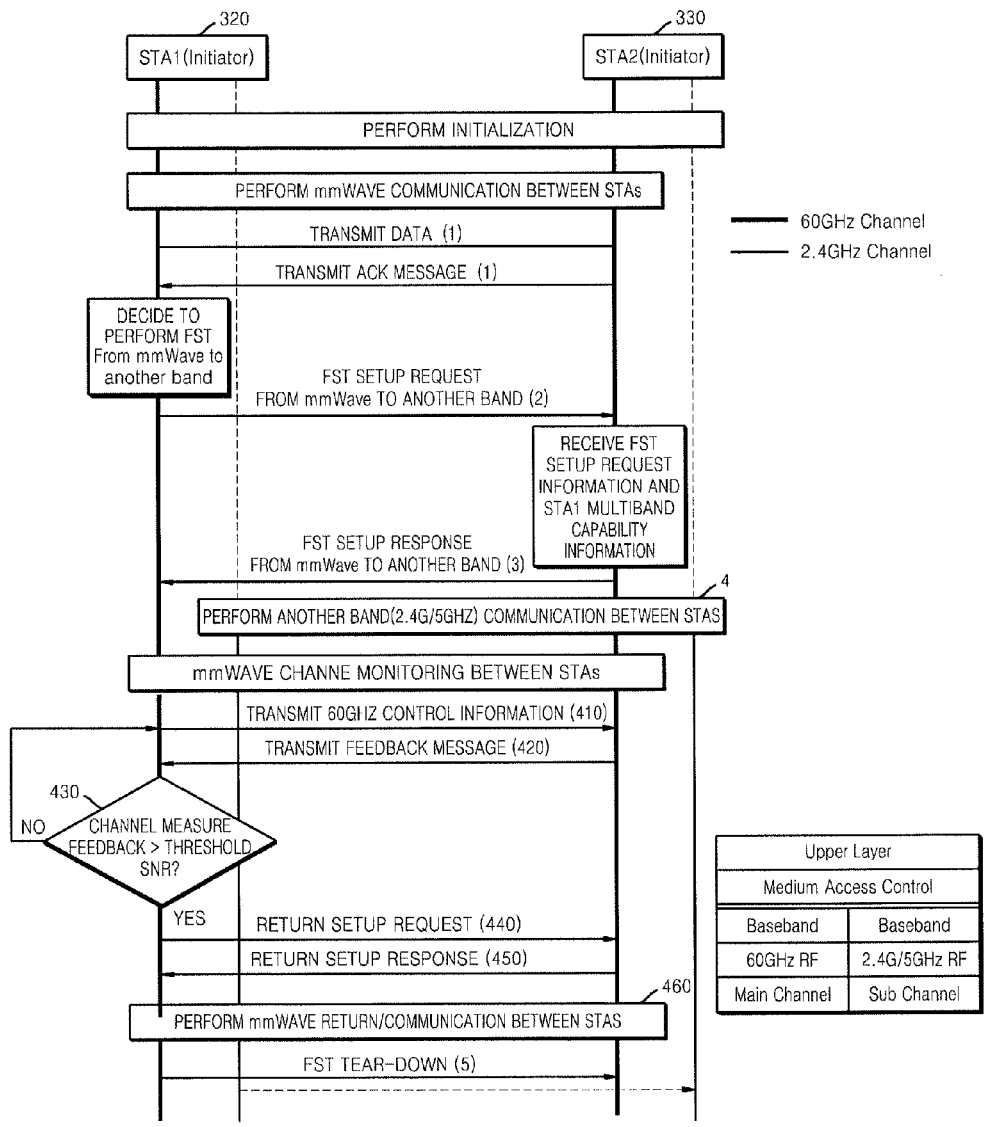
FIG. 4 is a diagram schematically illustrating a procedure for returning to a 60 GHz communication link after performing a 2.4 GHz data session according to an exemplary embodiment.

FIG. 4 is a diagram schematically illustrating a procedure for returning to a 60 GHz communication link after performing a 2.4 GHz data session according to an exemplary embodiment.

Operations '1' through '5' of FIG. 4 are the same as operations '1' through '5' of FIG. 3, and thus will not be described. If during data communication in a 60 GHz band, the channel state of the 60 GHz deteriorates, the initiator station 320 decides to perform FST. According to an exemplary embodiment, a channel state is checked based on a received signal strength indicator (RSSI) or a signal-to-noise ratio (SNR) in the 60 GHz band. If FST is performed, the 2.4 GHz band is used as a channel for data transmission and the 60 GHz band is used as a monitoring channel, thus allowing return to the 60 GHz communication channel anytime.

For channel monitoring, the initiator station 320 transmits control information to the responder station 330 in the 2.4 GHz or 60 GHz band in operation 410. The responder station 330 measures the channel state of the 60 GHz band, and transmits a feedback message to the initiator station 320 in the 2.4 GHz or 60 GHz band in operation 420. Although it is shown in FIG. 4 that the control information and the feedback message are transmitted in the 60 GHz band, the transmission may also be performed in the 2.4 GHz band for stable transmission according to an exemplary embodiment. The feedback message may include a parameter for determining a channel state, such as an RSSI, an SNR, an MCS, or a maximum throughput in the 60 GHz. The initiator station 320 determines the channel condition of the 60 GHz band by using the received feedback message and decides whether to return to the 60 GHz band in operation 430 based on the determined channel condition. For example, if the RSSI or the SNR exceeds a particular threshold, the initiator station 320 may decide to return to the 60 GHz band.

Once deciding to return to the 60 GHz band, the initiator station 320 transmits a return setup request message to the responder station 330 in operation 440. In response thereto, the responder station 330 transmits a return setup response message to the initiator station 320 in operation 450 and then returns to the 60 GHz band in operation 460. Thereafter, a doze mode or a sleep mode may be executed for the 2.4 GHz band. The return setup request message and the return setup response message may be transmitted in the 60 GHz band or the 2.4 GHz band. The return setup request message and the return setup response message may be transmitted by using the FST setup request message and the FST setup response message, respectively. The return setup request message and the return setup response message may be transmitted directly between the initiator 320 and the responder 330 or via a coordinator such as a PCP. According to an exemplary embodiment, the role of the initiator 320 and the role of the responder 330 may be exchanged to execute the channel monitoring and band returning procedure.

Figure 5:
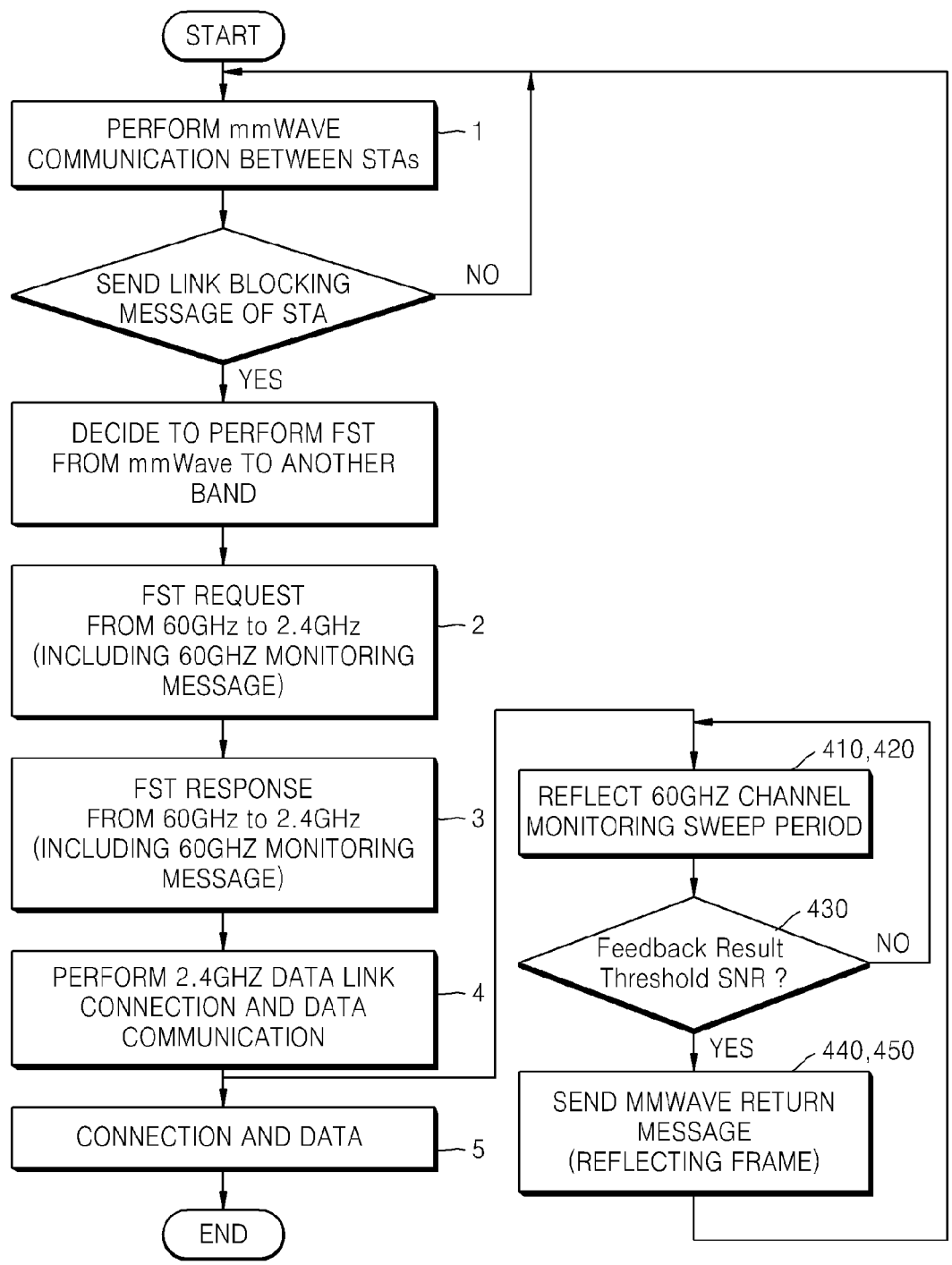
FIG. 5 is a flowchart schematically illustrating a method of returning to a 60 GHz communication link after performing a 2.4 GHz data session in an FST procedure according to an exemplary embodiment.

FIG. 5 is a flowchart schematically illustrating a method of returning to a 60 GHz communication link after performing a 2.4 GHz data session in an FST procedure according to an exemplary embodiment.

Functions of main blocks of FIG. 5 have already been described by using the same reference numerals as in FIGS. 3 and 4, and thus will not be repetitively described.

60 GHz channel monitoring in operations 410 through 430, that is, a channel measurement feedback operation is periodically performed. When the channel monitoring is not performed, a power saving mode may be executed for the 60 GHz band. In an exemplary embodiment, channel monitoring may be performed at intervals of N times an interval of a 60 GHz beacon generated by a PCP, thereby reducing power consumption for the 60 GHz band. Herein, N is a predefined integer.

When the channel state of the 60 GHz band is close to a threshold, repetitive transfers between the 60 GHz band and the 2.4 GHz band, that is, the oscillation or ping-pong phenomenon may occur. This phenomenon may be reduced by setting a maintenance timer for the 2.4 GHz data channel. In an exemplary embodiment, after FST to the 2.4 GHz band is performed once, the 2.4 GHz communication channel may be maintained during at least M×N times an interval of a 60 GHz beacon. Herein, M is a predefined integer.

FIGS. 6 and 7 are diagrams illustrating multiband control fields according to an exemplary embodiment.

Referring to FIG. 6, in a multiband control field 610, one of 3 bits allocated for a reserved field in the multiband control field 120 shown in FIG. 1 may be designated as, and allocated for, a channel sweep field. A channel sweep field of '1' indicates performing an operation of an mmWave awake mode, which also means continuous monitoring of a 60 GHz channel. That is, each station continuously receives beacon information from a PCP. A channel sweep field of '0' indicates performing an operation of an mmWave power saving mode, which also means long time beacon period listening, for example, receiving a 60 GHz beacon and monitoring a channel at intervals of N times an interval of the beacon.

Referring to FIG. 7, in a multiband control field 710, one of 3 bits allocated for a reserved field in the multiband control field 120 shown in FIG. 1 may be designated as, and allocated for, a peer station (STA) negotiation field. A peer STA negotiation field is a field regarding peer to peer (P2P) support channel monitoring. A peer STA negotiation field of '1' indicates that an initiator station and a responder station set a predetermined link monitoring period for a 60 GHz communication channel, such that they operate in an active mode only during the link monitoring period to perform channel monitoring and they execute in a power saving mode during times other than the monitoring period. A peer STA negotiation field of '0' indicates that such channel monitoring is not performed. The link monitoring period may be included in the FST setup request message during FST. An FST setup request message frame 810 including a link monitoring period is shown in FIG. 8.

Figures 8, 9:
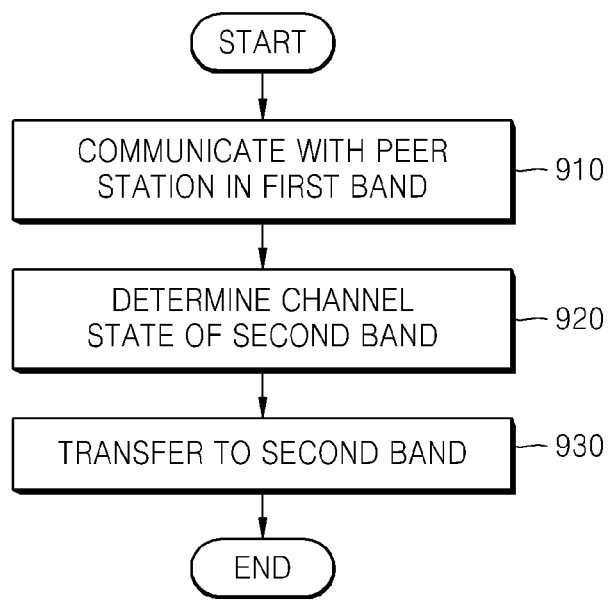
FIG. 8 is a diagram illustrating an FST request message frame including a link monitoring period according to an exemplary embodiment.
FIG. 9 is a flowchart schematically illustrating a returning method performed by a station after the station performs FST as an initiator according to an exemplary embodiment.

FIG. 9 is a flowchart schematically illustrating a returning method performed by a station after the station performs FST as the initiator 320 according to an exemplary embodiment.

Referring to FIG. 9, the returning method after FST according to an exemplary embodiment includes operation 910 of communicating with a peer station, e.g., the responder station 330, in a first band, e.g., 2.4 GHz, operation 920 of determining a channel state of a second band, e.g., 60 GHz, and operation 930 of transferring to the second band based on the determination result.

The returning method may further include an operation of transmitting multiband control information to the peer station in the first band or the second band. The multiband control information may include a channel monitoring field. For a channel monitoring field of '1', a station may receive beacon information from a coordinator at beacon intervals. For a channel monitoring field of '0', the station may receive beacon information from the coordinator at intervals which are products of beacon intervals and a predefined integer greater than 2.

The multiband control information may include a peer STA negotiation field. For a peer STA negotiation field of '1', the station enters an active mode during a predetermined time at predefined intervals in the second band to determine the channel state of the second band, and operates in a power saving mode during times other than the predetermined time for the second band. For a peer STA negotiation field of '0', the station may operate in the power saving mode for the second band.

Figure 10:
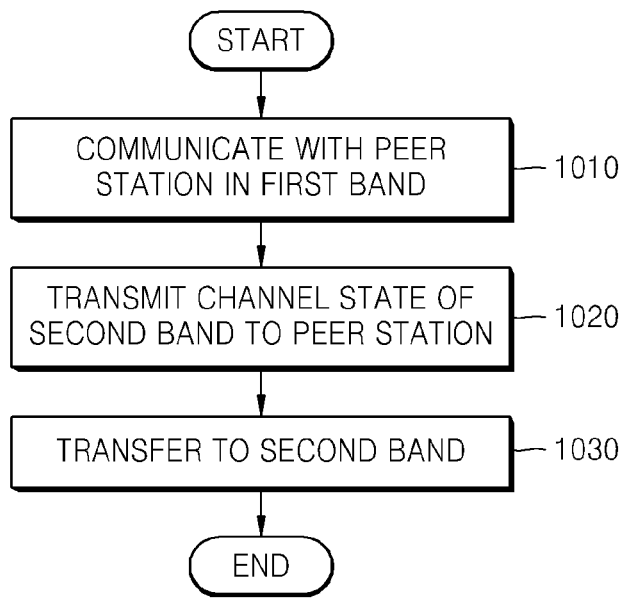
FIG. 10 is a flowchart schematically illustrating a returning method performed by a station after the station performs FST as a responder according to an exemplary embodiment.

FIG. 10 is a flowchart schematically illustrating a returning method performed by the station after the station performs FST as the responder 330 according to an exemplary embodiment.

Referring to FIG. 10, the returning method after FST according to an exemplary embodiment includes operation 1010 of communicating with a peer station, e.g., the initiator station 320, in the first band, e.g., 2.4 GHz, operation 1020 of transmitting a channel state of the second band, e.g., 60 GHz, to the peer station, and operation 1030 of transferring to the second band at the request of the peer station.

The returning method may further include an operation of receiving multiband control information from the peer station in the first band or the second band. The multiband control information may include a channel monitoring field. For a channel monitoring field of '1', the station may receive beacon information from a coordinator at beacon intervals. For a channel monitoring field of '0', the station may receive beacon information from the coordinator at intervals which are products of beacon intervals and a predefined integer greater than 2.

The multiband control information may include a peer STA negotiation field. For a peer STA negotiation field of '1', the station enters an active mode during a predetermined time at predefined intervals for the second band to transmit the channel state of the second band to the peer station, and operates in a power saving mode during times other than the predetermined time. For a peer STA negotiation field of '0', the station may operate in the power saving mode for the second band.

Figure 11:
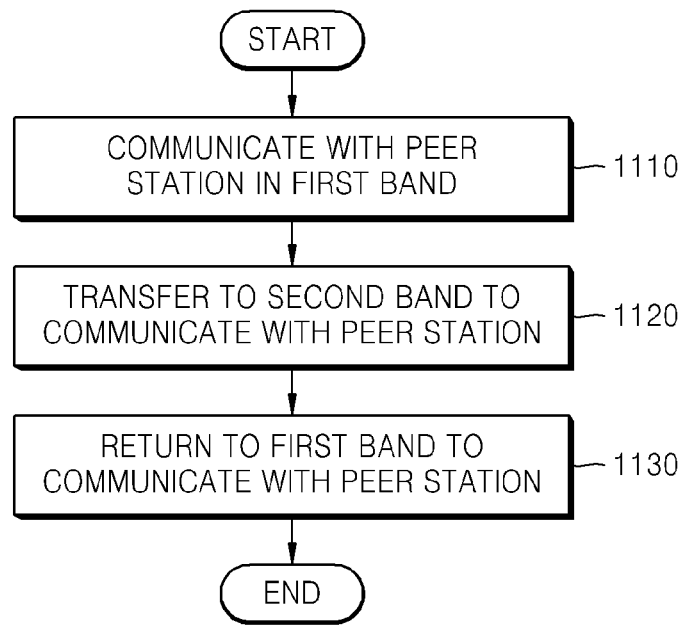
FIG. 11 is a flowchart schematically illustrating an FST and returning method performed by stations according to an exemplary embodiment.

FIG. 11 is a flowchart schematically illustrating an FST and returning method performed by the stations 320 and 330 according to an exemplary embodiment.

Referring to FIG. 11, the FST and returning method includes operation 1110 of communicating with a peer station in the first band, e.g., 60 GHz, operation 1120 of transferring to the second band, e.g., 2.4 GHz to communicate with the peer station when a channel state of the first band does not meet a predefined first condition during communication in the first band, and operation 1130 of returning to the first band to communicate with the peer station when the channel state of the first band meets a predefined second condition during communication in the second band.

Figure 12:
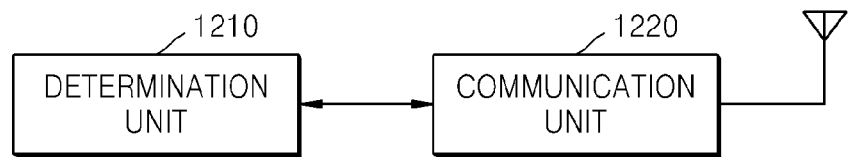
FIG. 12 is a block diagram schematically illustrating a station which returns after performing FST as an initiator according to an exemplary embodiment.

FIG. 12 is a block diagram schematically illustrating a station which returns after performing FST as the initiator station 320 according to an exemplary embodiment.

Referring to FIG. 12, the station according to an exemplary embodiment includes a communication unit 1220 which communicates with a peer station in the first band, e.g., 2.4 GHz or the second band, e.g., 60 GHz, and a determination unit 1210 which determines a channel state of the second band. The communication unit 1220 transfers to the second band based on the determination result of the determination unit 1210 during communication in the first band.

Figure 13:
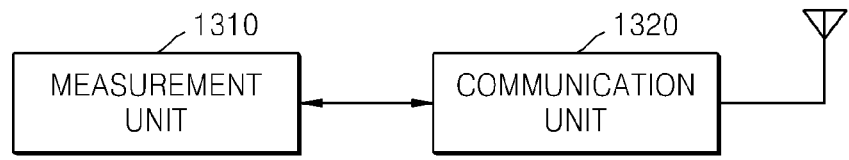
FIG. 13 is a block diagram schematically illustrating a station which returns after performing FST as a responder according to an exemplary embodiment.

FIG. 13 is a block diagram schematically illustrating a station which returns after performing FST as the responder station 330 according to an exemplary embodiment.

Referring to FIG. 13, the station according to the exemplary embodiment includes a communication unit 1320 which communicates with a peer station in the first band, e.g., 2.4 GHz or the second band, e.g., 60 GHz, and a measurement unit 1310 which measures a channel state of the second band. The communication unit 1320 transmits the channel state of the second band to the peer station, e.g., the initiator station 320, during communication in the first band, and transfers to the second band at the request of the peer station 320.

Figure 14:
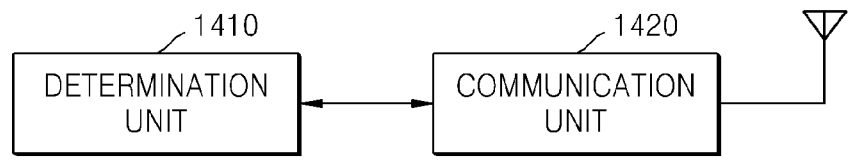
FIG. 14 is a block diagram schematically illustrating stations which return after performing FST according to an exemplary embodiment.

FIG. 14 is a block diagram schematically illustrating the stations 320 and 330 which return after performing FST according to an exemplary embodiment.

Referring to FIG. 14, the stations 320 and 330 according to the exemplary embodiment include a communication unit 1420 which communicates with a peer station in the first band, e.g., 60 GHz or the second band, e.g., 2.4 GHz, and a determination unit 1410 which determine a channel state of the first band. The communication unit 1420 transfers to the second band to communicate with a peer station when the channel state of the first band does not meet a predefined first condition during communication in the first band, and returns to the first band to communicate with the peer station when the channel state of the first band meets a predefined second condition during communication in the second band. The determination unit 1410 determines the channel state by measuring the channel state or receiving the channel state from the peer station.

As can be appreciated from the foregoing description, the exemplary embodiments provide a method and apparatus for returning to a 60 GHz band after performing FST to a 2.4 GHz band during communication in the 60 GHz band, such that data transmission speed can be improved by efficiently using the 60 GHz band.

Meanwhile, the exemplary embodiments can be embodied as a computer-readable code on a computer-readable recording medium. Examples of the computer-readable recording medium include magnetic storage media and optical reading media (e.g., CD-ROMs, or DVDs). The computer-readable recording medium can also be distributed over network coupled computer systems so that the computer readable code is stored and executed in a distributed fashion.

Exemplary embodiments may also be written as computer programs transmitted over a computer-readable transmission medium, which may include carrier waves (such as data transmission through the Internet), and received and implemented in general-use or special-purpose digital computers that execute the programs. Moreover, while not required in all aspects, one or more of the above-described units can include a processor or microprocessor executing a computer program stored in a computer-readable medium.

While the exemplary embodiments have been particularly shown and described with reference to exemplary embodiments, it will be understood by one of ordinary skill in the art that various changes in form and detail may be made therein without departing from the spirit and scope of the exemplary embodiments as defined by the following claims. Accordingly, the technical spirit and scope of the appended claims are not limited by the disclosed exemplary embodiments.

What is claimed is:

1. A communication method of a multiband communication device, the method comprising:
communicating with a peer device in a first communication band;
determining a channel state of a second communication band; and
transferring to the second communication band based on a result of the determining,
wherein the communication device enters an active mode during a predetermined period at predefined intervals in the second communication band to determine the channel state of the second communication band and transmit the channel state of the second communication band to the peer device, and operates in a power-saving mode during times other than the predetermined period in the second communication band.

2. The communication method of claim 1, wherein the determining comprises:
transmitting control information to the peer device in the first communication band or the second communication band;
receiving feedback information from the peer device in the first communication band or the second communication band; and
determining a channel state of the second communication band based on the feedback information.

3. The communication method of claim 2, wherein the transmitting of the control information and the receiving of the feedback information are performed directly with the peer device or via a coordinator.

4. The communication method of claim 2, wherein the feedback information comprises a received signal strength indicator (RSSI) or a signal-to-noise ratio (SNR) with respect to communication in the second communication band.

5. The communication method of claim 1, wherein the determining comprises receiving beacon information from a coordinator in the second communication band at intervals which are products of beacon intervals and a predefined integer.

6. The communication method of claim 1, wherein the determining comprises determining the channel state of the second communication band during a predetermined time at predefined intervals.

7. The communication method of claim 1, wherein the predefined intervals are products of beacon intervals and a predefined integer.

8. The communication method of claim 1, wherein the transferring comprises transferring to the second communication band after an elapse of a predefined time from a start of the communication with the peer device in the first communication band.

9. The communication method of claim 1, wherein the determining comprises determining the channel state of the second communication band after an elapse of a predefined time from a start of the communication with the peer device in the first communication band.

10. The communication method of claim 8, wherein the predefined time is a product of a beacon interval and a predefined integer.

11. The communication method of claim 1, wherein the transferring comprises:
transmitting a second communication band communication setup request message to the peer device in the first communication band or the second communication band; and
receiving a second communication band communication setup response message from the peer device in the first communication band or the second communication band.

12. A communication method of a multiband communication device, the method comprising:

communicating with a peer device in a first communication band;

transmitting a channel state of a second communication band to the peer device; and transferring to the second communication band at a request of the peer device, wherein the communication device enters an active mode during a predetermined period in the second communication band to determine the channel state of the second communication band and transmit the channel state of the second communication band to the peer device, and operates in a power-saving mode during times other than the predetermined period in the second communication band.

13. The communication method of claim 12, wherein the transmitting comprises:

receiving control information from the peer device in the first communication band or the second communication band; and transmitting feedback information comprising the channel state to the peer device in the first communication band or the second communication band.

14. The communication method of claim 12, wherein the transmitting comprises receiving beacon information from a coordinator in the second communication band at intervals which are products of beacon intervals and a predefined integer.

15. The communication method of claim 12, wherein the transmitting comprises transmitting the channel state of the second communication band during a predetermined time at predefined intervals.

16. The communication method of claim 12, wherein the transferring comprises transferring to the second communication band after an elapse of a predefined time from the start of the communication with the peer device in the first communication band.

17. The communication method of claim 12, wherein the transmitting comprises transmitting the channel state of the second communication band after an elapse of a predefined time from a start of the communication with the peer device in the first communication band.

18. The communication method of claim 12, wherein the transferring comprises:

receiving a second communication band communication setup request message from the peer device in the first communication band or the second communication band; and transmitting a second communication band communication setup response message to the peer device in the first communication band or the second communication band.

19. A multiband communication device comprising:

a communication unit, which communicates with a peer device in a first communication band or a second communication band; and a determination unit, which determines a channel state of the second communication band, wherein the communication unit transfers to the second communication band based on a result of the determination during communication in the first communication band, and wherein the communication device enters an active mode during a predetermined period in the second communication band to determine the channel state of the second communication band and transmit the channel state of the second communication band to the peer device, and operates in a power-saving mode during times other than the predetermined period in the second communication band.

20. The multiband communication device of claim 19, wherein the communication unit transmits control information to the peer device in the first communication band or the second communication band and receives feedback information from the peer device in the first communication band or the second communication band, and the determination unit determines the channel state of the second communication band based on the feedback information.

21. The multiband communication device of claim 19, wherein the communication unit receives beacon information from a coordinator in the second communication band at predefined intervals which are products of beacon intervals and a predefined integer.

22. The multiband communication device of claim 19, wherein the communication unit transfers to the second communication band after an elapse of a predefined time from a start of communication with the peer device in the first communication band.

23. A multiband communication device comprising:

a communication unit, which communicates with a peer device in a first communication band or a second communication band; and a measurement unit, which measures a channel state of the second communication band, wherein the communication unit transmits the channel state of the second communication band to the peer device during communication in the first communication band, and transfers to the second communication band at the request of the peer device, and wherein the communication device enters an active mode during a predetermined period in the second communication band to determine the channel state of the second communication band and transmit the channel state of the second communication band to the peer device, and operates in a power-saving mode during times other than the predetermined period in the second communication band.

24. The multiband communication device of claim 23, wherein the communication unit receives control information from the peer device in the first communication band or the second communication band and transmits feedback information including the channel state of the second communication band to the peer device in the first communication band or the second communication band.

25. The multiband communication device of claim 23, wherein the communication unit receives beacon information from a coordinator in the second communication band at predefined intervals which are products of beacon intervals and a predefined integer.

26. The multiband communication device of claim 23, wherein the communication unit transfers to the second communication band after an elapse of a predefined time from a start of communication with the peer device in the first communication band.

27. A non-transitory computer-readable recording medium having embodied thereon a program for executing a communication method of a multiband communication device, the method comprising:

communicating with a peer device in a first communication band;

determining a channel state of a second communication band; and transferring to the second communication band based on a result of the determining,
wherein the communication device enters an active mode during a predetermined period in the second communication band to determine the channel state of the second communication band and transmit the channel state of the second communication band to the peer device, and operates in a power-saving mode during times other than the predetermined period in the second communication band.

28. A non-transitory computer-readable recording medium having embodied thereon a program for executing a communication method of a multiband communication device, the method comprising:
- communicating with a peer device in a first communication band;
- transmitting a channel state of a second communication band to the peer device; and
- transferring to the second communication band at a request of the peer device,
- wherein the communication device enters an active mode during a predetermined period in the second communication band to determine the channel state of the second communication band and transmit the channel state of the second communication band to the peer device, and operates in a power-saving mode during times other than the predetermined period in the second communication band.

* * * * *